(12) United States Patent
Xia (10) Patent No.: US 11,619,314 B2
(45) Date of Patent: Apr. 4, 2023

(54) SWITCHING VALVE

(71) Applicant: Beijing Kohler Ltd., Beijing (CN)

(72) Inventor: Pengcheng Xia, Beijing (CN)

(73) Assignee: BEIJING KOHLER LTD., Beijing (CN)

( * ) Notice: Subject to any disclaimer, the term of this patent is extended or adjusted under 35 U.S.C. 154(b) by 0 days.

(21) Appl. No.: 17/329,895

(22) Filed: May 25, 2021

(65) Prior Publication Data

US 2021/0372535 A1 Dec. 2, 2021

(30) Foreign Application Priority Data

May 27, 2020 (CN) .......................... 202020917279.0

(51) Int. Cl.
*F16K 27/02* (2006.01)
*F16K 11/22* (2006.01)
*F16K 11/18* (2006.01)

(52) U.S. Cl.
CPC .............. *F16K 11/18* (2013.01); *F16K 11/22* (2013.01); *F16K 27/0236* (2013.01); *F16K 27/0263* (2013.01)

(58) Field of Classification Search
CPC ........... F16K 31/3855; F16K 31/52416; F16K 11/04; F16K 11/22; F16K 27/0236; F16K 27/0263; F16K 15/1401; F16K 15/1402; F16K 15/144; F16K 15/1825; F16K 15/1845; E03C 1/023; E03C 2201/30
See application file for complete search history.

(56) References Cited

U.S. PATENT DOCUMENTS

| | | | | |
|---|---|---|---|---|
| 4,241,761 A | * | 12/1980 | Miller | F16K 41/103 137/884 |
| 4,721,133 A | * | 1/1988 | Sundblom | F16K 11/022 251/262 |
| 5,765,591 A | * | 6/1998 | Wasson | F16K 27/003 137/606 |
| 6,394,136 B1 | * | 5/2002 | Rohrbeck | F16K 11/052 137/867 |
| 6,834,675 B1 | * | 12/2004 | Gill | F16K 15/144 251/287 |
| 8,752,584 B2 | * | 6/2014 | Grandvallet | F16K 31/10 137/553 |
| 2019/0219184 A1 | * | 7/2019 | Huang | F16K 11/22 |
| 2022/0033750 A1 | * | 2/2022 | Lundin | F16K 11/22 |

FOREIGN PATENT DOCUMENTS

| | | | | |
|---|---|---|---|---|
| DE | 1140417 B | * | 6/1959 | ............. F16K 11/22 |
| WO | WO-2014076238 A1 | * | 5/2014 | ............. F16K 11/166 |

* cited by examiner

*Primary Examiner* — Hailey K. Do
(74) *Attorney, Agent, or Firm* — Foley & Lardner LLP (57) ABSTRACT

A switching valve includes a valve body, a diaphragm, and a driving assembly. The valve body includes a valve cavity, a water inlet, a first water outlet, and a second water outlet in communication with the valve cavity. The diaphragm includes two unsealing parts connected with the driving assembly and respectively arranged opposite to the first water outlet and the second water outlet. Each unsealing part can control opening or closing of the first water outlet or the second water outlet. The driving assembly can individually drive each of the unsealing parts to switch between opening and closing such that at least one of the first water outlet and the second water outlet is in an open state.

20 Claims, 4 Drawing Sheets

SWITCHING VALVE

CROSS-REFERENCE TO RELATED PATENT APPLICATIONS

This application claims the benefit of and priority to Chinese Utility Model No. 202020917279.0, filed on May 27, 2020, the entire disclosure of which is hereby incorporated by reference herein.

TECHNICAL FIELD

The present disclosure generally relates to the technical field of sanitary plumbing, and more specifically, to a switching valve.

BACKGROUND

In the sanitary plumbing industry, existing faucets typically use a lifting water separator to switch the water flow. Due to structural limitation of the lifting water separator, the water pressure is required to be kept within a certain range. If the water pressure is too high, it will be difficult to switch the water flow; and if the water pressure is too low, it will not be able to complete the water switching. In addition, the water quality in some areas is poor, and the lifting water separator cannot operate normally due to the scale incrustation, which affects the normal use of the faucet.

Therefore, there is a need for a switching valve which can solve the above-mentioned problem. In view of this, a switching valve is proposed to solve the above problem.

SUMMARY

At least one embodiment relates to a switching valve. The switching valve includes a valve body, a diaphragm, and a driving assembly. The valve body includes a valve cavity, a water inlet, a first water outlet, and a second water outlet in communication with the valve cavity. The diaphragm includes two unsealing parts respectively arranged opposite to the first water outlet and the second water outlet. The unsealing parts are connected with the driving assembly. Each unsealing part can control opening or closing of the first water outlet or the second water outlet. The driving assembly can individually drive each of the unsealing parts to switch between opening and closing such that at least one of the first water outlet and the second water outlet is in an open state.

BRIEF DESCRIPTION OF THE DRAWINGS

Through the following description of the embodiments in conjunction with the drawings, the above-mentioned features and technical advantages of the present disclosure will become clearer and easier to understand.

DETAILED DESCRIPTION OF THE EMBODIMENTS

According to an exemplary embodiment, a switching valve comprises a valve body, a diaphragm, and a driving assembly. The valve body comprises a valve cavity and a water inlet, a first water outlet and a second water outlet in communication with the valve cavity. The diaphragm comprises two unsealing parts respectively arranged opposite to the first water outlet and the second water outlet. Each unsealing part can control opening or closing of the first water outlet or the second water outlet opposite thereto. The driving assembly, in which both of the two unsealing parts are connected, can individually drive each of the unsealing parts to switch between opening and closing, such that at least one of the first water outlet and the second water outlet is in an open state. The valve body of the switching valve of the present disclosure is kept in a normally open state. By controlling the opening and closing of the diaphragm, the switching valve can switch between the first water outlet and the second water outlet to realize the switching of the water flow paths and reduce the influence of water pressure.

A switching valve according to an exemplary embodiment comprises a valve body, which comprises a valve cavity and a water inlet, a first water outlet and a second water outlet in communication with the valve cavity.

A switching valve according to another exemplary embodiment comprises a diaphragm, which comprises two unsealing parts respectively arranged opposite to the first water outlet and the second water outlet, wherein each unsealing part can control opening or closing of the first water outlet or the second water outlet opposite thereto.

A switching valve according to another exemplary embodiment comprises a driving assembly, wherein both of the two unsealing parts are connected with the driving assembly, and the driving assembly can individually drive each of the unsealing parts to switch between opening and closing, such that at least one of the first water outlet and the second water outlet is in an open state.

According to an exemplary embodiment, a cavity wall of the valve cavity is provided with two through holes spaced apart along a length direction of the valve cavity, wherein the two through holes are arranged opposite to a flow channel for the first water outlet and a flow channel for the second water outlet respectively.

According to an exemplary embodiment, a housing is sleeved and fixed on the valve body, and the water inlet and the first water outlet both extend out of the housing, in which an operating cavity for accommodating the driving assembly is provided between the housing and the valve cavity. A first through hole, which is in communication with the second water outlet, and a second through hole and a third through hole, which is in communication with the operating cavity, are provided on the housing. The driving assembly includes two buttons, which are respectively penetrated through the second through hole and third through hole.

According to an exemplary embodiment, the diaphragm comprises a diaphragm body and the two unsealing parts. The two unsealing parts are arranged on the diaphragm body and spaced apart along a length direction, in which the diaphragm body is connected to a top cavity wall of the valve cavity. The two unsealing parts can pass through the two through holes to partially enter the valve cavity respectively, in which each unsealing part can enter or exit the flow channel for the first water outlet/the flow channel for the second water outlet opposite thereto.

According to an exemplary embodiment, the unsealing parts include an elastic membrane which is connected to the diaphragm body and can be lifted and lowered. The unsealing parts also include a water inlet hole and a snap-in sealing part which are arranged oppositely and arranged on the elastic membranes. The valve cavity supplies liquid to the elastic membrane via the water inlet hole, the snap-in sealing part penetrates through the elastic membrane and extends sideways, and the snap-in sealing part includes a hollow structure which extends in an axial direction, in which the driving assembly can penetrate through the hollow structure and can be moved back and forth, so as to open or close the snap-in sealing part, so that the snap-in sealing part can connect or cut off the flow channel for the first water outlet/the second water outlet.

According to an exemplary embodiment, flow area of the hollow structure firstly decreases and then increases toward the valve cavity from far to near.

According to an exemplary embodiment, the driving assembly includes an inner shell, a transmission slider, two driving rods, and two driving sliders.

According to an exemplary embodiment, the inner shell is arranged in the operating cavity and is connected to the valve body, and a cavity is provided in the inner shell.

According to an exemplary embodiment, the transmission slider is arranged in the cavity and can reciprocate in length direction in the cavity.

According to an exemplary embodiment, opposite ends of the transmission slider are provided with guiding surfaces, in which a clamping part is arranged between the guiding surfaces, and there are limiting slots on opposite sides of the clamping part.

According to an exemplary embodiment, the two driving sliders are respectively sleeved and fixed on a top end of the two driving rods, in which the top end of each driving slider is fixed with an opposite button, and opposite sides of bottom ends of each driving slider are respectively provided with a driving block for cooperating with the guide surface and an engaging part that is engaged with the limiting slot. The bottom ends of the driving rods penetrate the inner shell and extends into the hollow structure of the snap-in sealing part.

According to an exemplary embodiment, a spring is sleeved on the driving rods, in which a top end of the spring is fixed to the driving sliders, and a bottom end of the spring can abut against the inner shell.

According to an exemplary embodiment, the inner shell includes a sliding seat and a cover covered on the sliding seat which are enclosed to form the cavity, and the sliding seat is fixed to the valve body on a side of the sliding seat facing away from the cover.

The valve body of the switching valve according to an exemplary embodiment is kept in a normally open state. By controlling the opening and closing of the diaphragm, the switching valve can switch between the first water outlet and the second water outlet to realize the switching of the water flow paths and reduce the influence of water pressure.

In order to make the purpose, technical solutions and advantages of the present disclosure clearer, the present disclosure will be further described in detail below, in conjunction with the specific embodiments and with reference to the drawings, wherein the same components are indicated by the same reference numerals. It should be noted that the wordings "front", "rear", "left", "right", "upper" and "lower" used in the following description refer to the directions in the drawings. The wordings "inner" and "outer" refer to the direction toward or away from the geometric center of a particular component, respectively.

Figure 1:
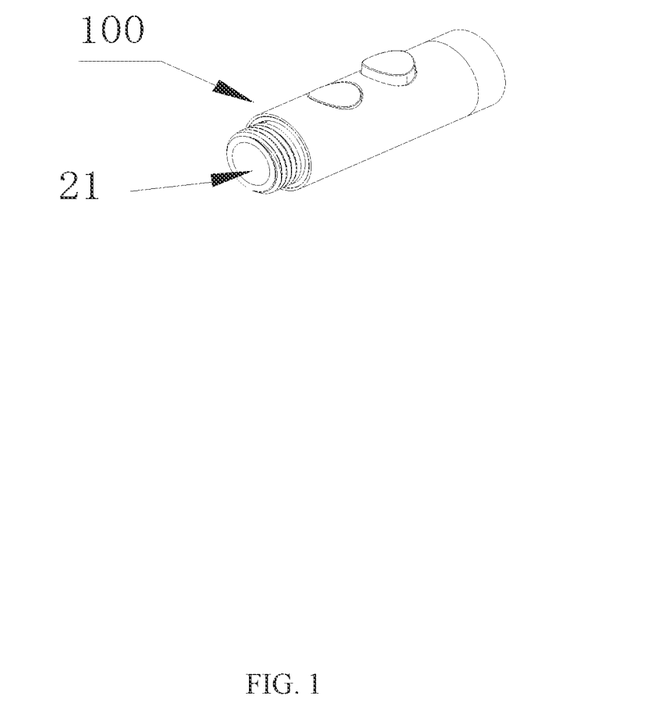
FIG. 1 is a schematic view of a switching valve, according to an exemplary embodiment.
Figure 2:
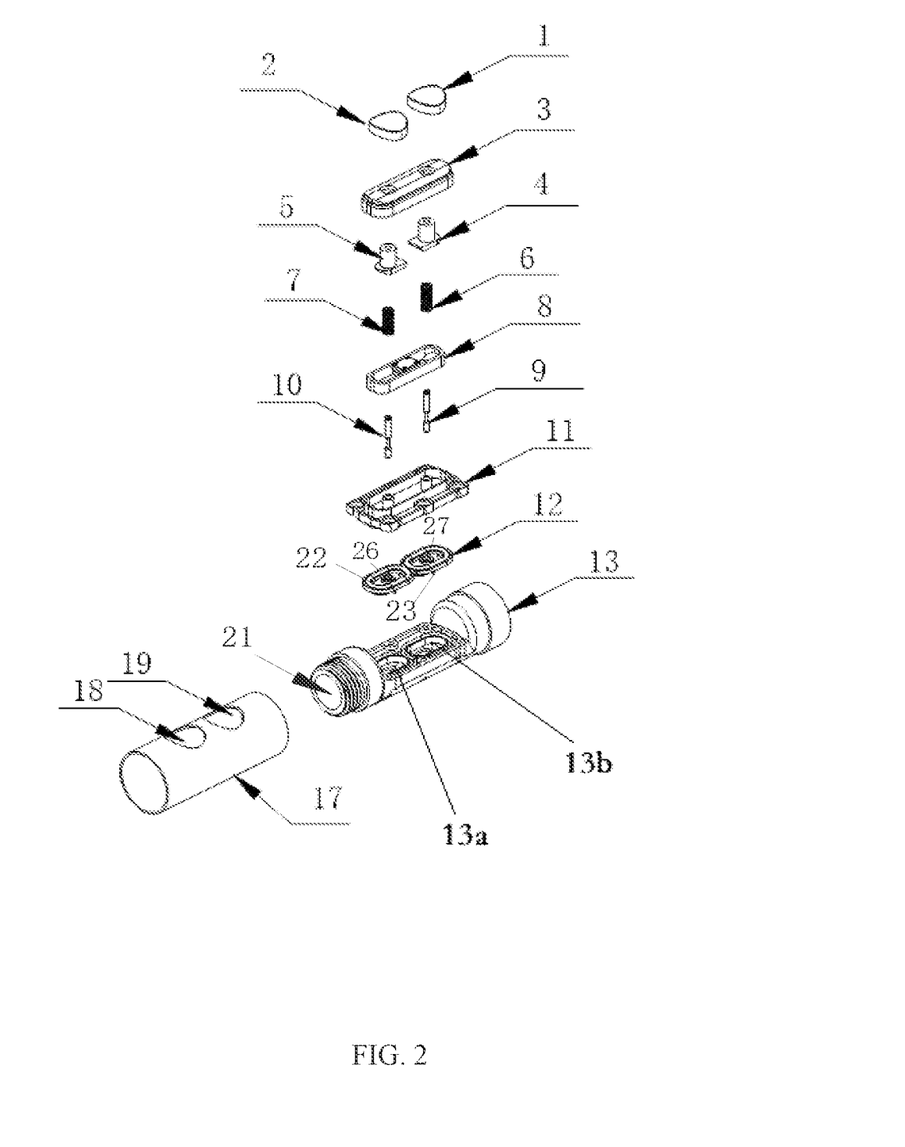
FIG. 2 is an exploded view of the switching valve of FIG. 1, according to an exemplary embodiment.

FIG. 1 is a schematic view of a switching valve according to an exemplary embodiment. FIG. 2 is an exploded view of the switching valve of FIG. 1. As shown in FIGS. 1 and 2, the switching valve 100 includes a valve body 13, a diaphragm 12 and a driving assembly.

The valve body 13 includes a valve cavity 21, a water inlet 14, a first water outlet 15, and a second water outlet 16 which are in communication with the valve cavity 21.

The diaphragm 12 includes two unsealing parts 22, 23 respectively arranged opposite to the first water outlet 15 and the second water outlet 16. Each unsealing part 22, 23 can control the opening or closing of the corresponding water outlet opposite thereto.

Both of the two unsealing parts 22, 23 are connected with a driving assembly, and the driving assembly can individually drive each unsealing part 22, 23 to switch between opening and closing, such that at least one of the first water outlet 15 and the second water outlet 16 is in an open state.

At least one of the first water outlet 15 and the second water outlet 16 is in an open state. When the driving assembly drives the unsealing part 22 for the first water outlet 15 to be in an open state, the unsealing part 23 for the second water outlet 16 is in a closed state. At this time, the first water outlet 15 is in an open state, and the second water outlet 16 is in a closed state. The liquid entering the valve cavity 21 from the water inlet 14 only flows out from the first water outlet 15. When the driving assembly drives the unsealing part 23 for the second water outlet 16 to be in an open state, the unsealing part 22 for the first water outlet 15 is in a closed state. At this time, the second water outlet 16 is in an open state, the first water outlet 15 is in a closed state, and the liquid entering the valve cavity 21 from the water inlet 14 only flows out from the second water outlet 16. When the driving assembly drives the unsealing part 22 for the first water outlet 15 and that for the second water outlet 16 to be in open state, the first water outlet 15 and the second water outlet 16 are both in open state, and the liquid entering the valve cavity 21 from the water inlet 14 flows out from the first water outlet 15 and the second water outlet 16. By adopting the above-mentioned switching valve 100, the valve body 13 is kept in a normally open state. By controlling the opening and closing of the diaphragm 12, a user can switch water flow path between the first water outlet 15 and the second water outlet 16, and the influence of the water pressure on water switching is reduced.

According to an exemplary embodiment, a cavity wall of the valve cavity 21 is provided with two through holes 13a, 13b spaced apart along the length direction of the valve cavity 21. The two through holes 13a, 13b are respectively arranged opposite to flow channels 24, 25 for the first water outlet 15 and the second water outlet 16. The flow channel 24 for the first water outlet 15 refers to a first cavity guiding the water from the water inlet 14 to the first water outlet 15 and being enclosed by the side wall extending from the bottom cavity wall of the valve cavity 21 opposite to the through hole near the first water outlet 15. The bottom of the first cavity is provided with a notch in communication with the first water outlet 15. The flow channel 25 for the second water outlet 16 refers to a second cavity guiding the water from the water inlet 14 to the second water outlet 16 and being enclosed by the side wall extending from the bottom cavity wall of the valve cavity 21 opposite to the through hole near the second water outlet 16. The second cavity is in communication with the second water outlet 16. The water inlet 14, the first cavity, and the first water outlet 15 form a first water flow path; and the water inlet 14, the second cavity and the second water outlet 16 form a second water flow path (see the arrows in FIGS. 3 and 4). The second water flow path overlaps part of the first water flow path. The diaphragm 12 is arranged on a top cavity wall of the valve cavity 21. By allowing either of the two unsealing parts 22, 23 to pass through the corresponding one of the two through holes 13a, 13b individually, sealing the corresponding flow channel 24 for the first water outlet 15 or the second water outlet 16, and simultaneously unsealing the other flow channel 25, the diaphragm 12 enables the first water outlet 15 or the second water outlet 16 to continuously discharge water.

The water inlet 14, the first water outlet 15 and the second water outlet 16 may be arranged at two ends of the valve body 13 and between the two ends of the valve body 13. In the present embodiment, the water inlet 14 and the first water outlet 15 are respectively arranged at two opposite ends of the valve cavity 21, and the second water outlet 16 is arranged on a bottom cavity wall of the valve cavity 21. In order to be adapted to a specific installation, the second water outlet 16 and the first water outlet 15 can also be both arranged on the valve cavity 21, or exchange positions. The position of the water inlet 14 can also be adjusted to the other end of the valve cavity 21 or to a suitable position of the valve cavity 21, according to the actual environment.

Figure 3:
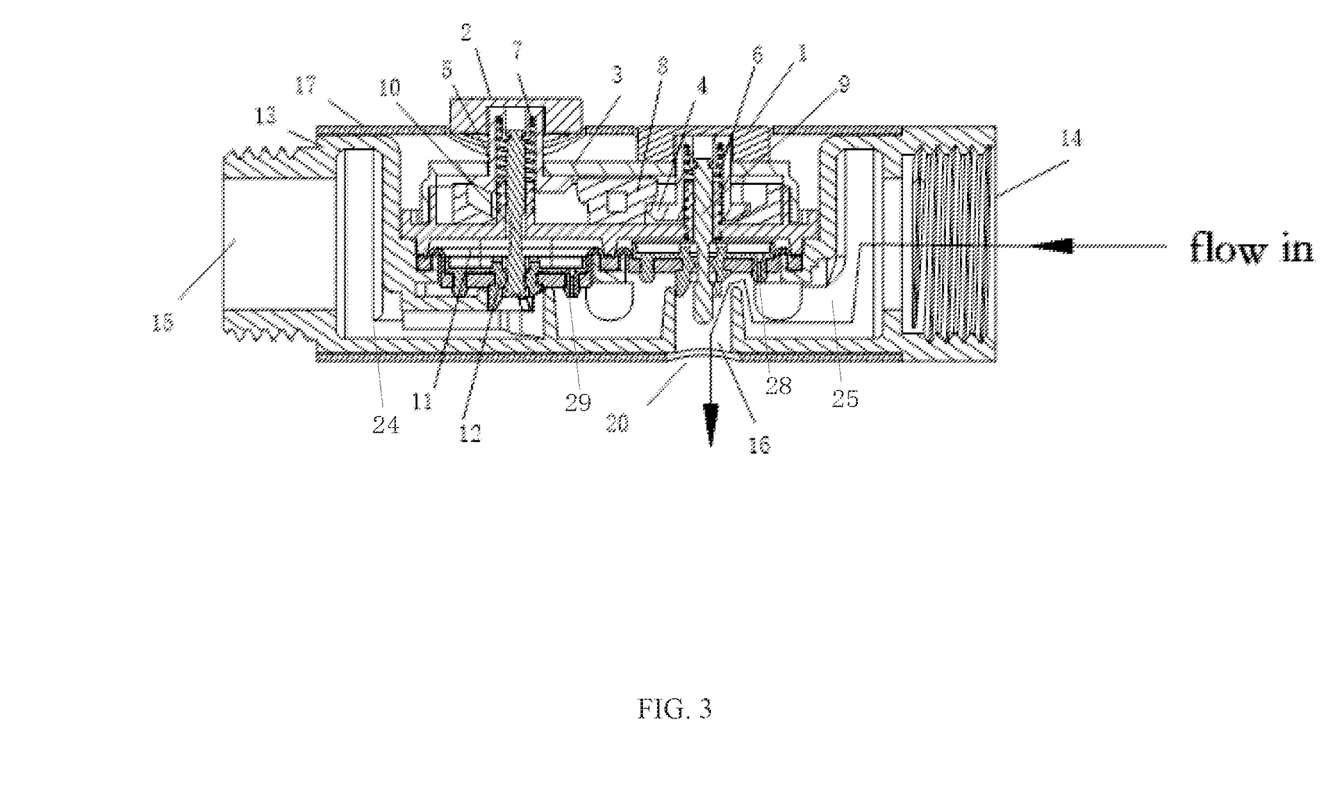
FIG. 3 is a schematic view of a first use state of the switching valve of FIG. 1, according to an exemplary embodiment.
Figure 4:
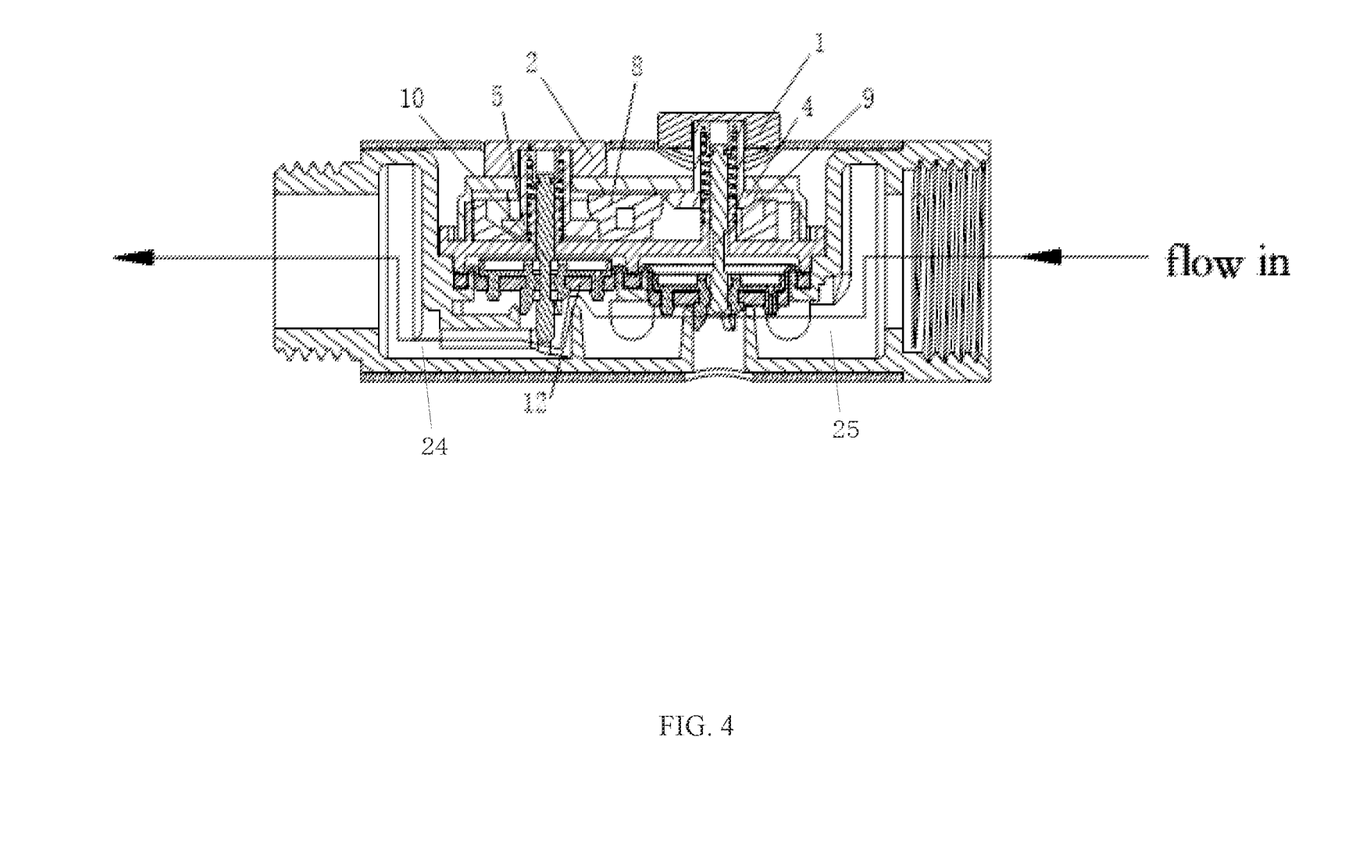
FIG. 4 is a schematic view of a second use state of the switching valve of FIG. 1, according to an exemplary embodiment.

The flow channel 24 for the first water outlet 15 is in the shape of a broken line, and the flow channel 25 of the second water outlet 16 is in the shape of a straight line (see the arrows in FIGS. 3 and 4).

In the present embodiment, the valve cavity 21 is U-shaped and includes a horizontal channel and vertical channels arranged at two opposite ends of the horizontal channel. The water inlet 14 and the first water outlet 15 are respectively in communication with the two vertical channels and the second water outlet 16 is in communication with the horizontal channel.

In the present embodiment, the through holes 13a, 13b are waist-shaped, and the unsealing parts 22, 23 of the diaphragm 12 cover the through holes respectively.

In the present embodiment, the inner side wall of the water inlet 14 may be provided with threads for thread connection with a water supply pipe. The outer side walls of the first water outlet 15 and/or the second water outlet 16 may be provided with threads so as to be threaded with corresponding mating parts.

According to an exemplary embodiment, a housing 17 is sleeved and fixed on the valve body 13, and the water inlet 14 and the first water outlet 15 both extend out of the housing 17. An operating cavity for accommodating the driving assembly is provided between the housing 17 and the valve cavity 21. On the housing 17, a first through hole 20 which is in communication with the second water outlet 16, as well as a second through hole 18 and a third through hole 19 that are both in communication with the operating cavity are provided. The driving assembly includes two buttons penetrating through the second through hole 18 and the third through hole 19 respectively. The operation cavity and the valve cavity 21 are arranged separately, such that most components of the driving assembly can be protected from scale caused by liquid immersion, thus the service life of the driving assembly and the valve body 13 is increased. The driving assembly drives the two unsealing parts 22, 23 to open or close respectively through the two buttons, so as to facilitate operation and switching. The housing 17 provides a sealed environment and protection for the valve body 13 and operating assembly.

In this embodiment, the housing 17 has a hollow structure along the axial direction. A slot is provided on the valve body 13, and the housing 17 is snap-connected with the valve body 13. The first through hole 20 is provided at bottom of the housing 17, while the second through hole 18 and the third through hole 19 are both provided at top of the housing 17 and are spaced apart along the length direction.

In this embodiment, the two buttons are a first button 2 and a second button 1, respectively. The first button 2 and the second button 1 are respectively arranged in the second through hole 18 and the third through hole 19. Pressing the first button 2 or the second button 1 causes a corresponding unsealing part 22, 23 opened, and pressing the same button again causes the corresponding unsealing part 22, 23 closed. The first button 2 controls the on and off of the first water flow path, and the second button 1 controls the on and off of the second water flow path.

According to an exemplary embodiment, the diaphragm 12 includes a diaphragm body, and two unsealing parts 22, 23 which are arranged on the diaphragm body and spaced apart along the length direction. The diaphragm body is connected to the top cavity wall of the valve cavity 21, and the two unsealing parts 22, 23 can pass through the two through holes to partially enter the valve cavity 21 respectively, wherein each unsealing part 22, 23 can enter or exit the flow channel 24, 25 for the first water outlet 15/the second water outlet 16 opposite thereto. The diaphragm 12 is fixed to the valve body 13 through the diaphragm body. The first water outlet 15 is in communication with the valve cavity 21 and located at a certain distance from the diaphragm 12. When the diaphragm 12 sinks, the unsealing part 22 can seal the flow channel 24 for the first outlet 15, so the first water outlet 15 no longer discharges water; and when the diaphragm 12 is reset, the unsealing part 22 exits the flow channel 24 for the first water outlet 15, so the first water outlet 15 is opened and the first water outlet 15 discharges water. The second water outlet 16 is arranged at the bottom of the valve cavity 21 and located at a certain distance from the diaphragm 12. When the diaphragm 12 sinks, the unsealing part 23 can seal the flow channel 25 for the second water outlet 16, so the second water outlet 16 no longer discharges water; and when the diaphragm 12 is reset, the unsealing part 23 exits the flow channel 25 for the second water outlet, so the second water outlet 16 is opened and the second water outlet 16 discharges water. The diaphragm 12 has a simple structure and good effect for controlling switching.

According to an exemplary embodiment, the unsealing parts 22, 23 include: elastic membranes which are connected to the diaphragm body and can be lifted and lowered, as well as water inlet holes 26, 27 and a snap-in sealing part 28, 29 which are arranged oppositely and arranged on the elastic membranes. The valve cavity 21 supplies liquid to the elastic membranes via the water inlet holes 26, 27. The snap-in sealing part 28, 29 penetrates through the elastic membranes and extends sideways. The snap-in sealing part 28, 29 includes a hollow structure extending in axial direction. The driving assembly can penetrate through the hollow structure and can move back and forth to open or close the snap-in sealing part 28, 29, so that the snap-in sealing part 28, 29 can connect or cut off the flow channel 24, 25 for the first water outlet 15/second water outlet 16. When the second button 1 is pressed, the first button 2 is in a pop-up state and the driving assembly drives the snap-in sealing part 28 (right side in FIG. 3) that controls the on-off of the second water flow path to be open; that is, the liquid entering the valve cavity 21 passes through the right water inlet hole 27 and enters the right elastic membrane. Since the right snap-in sealing part 28 is open, the liquid flows from the right snap-in sealing part 28, through the corresponding flow channel 25, into the second water outlet 16. The liquid in the valve cavity 21 flows out of the second water outlet 16 through corresponding flow channel 25. At the same time, the snap-in sealing part 29 (left side in FIG. 3) which controls the on-off of the first water outlet 15 is closed; that is, the liquid entering the valve cavity 21 passes through the left water inlet hole 26 and enters the left elastic membrane. Thus, the left elastic membrane moves down under the water pressure, so the liquid cannot enter the corresponding flow channel 24 to flow out of the first water outlet 15. The left elastic membrane is reset when water pressure is released. When the first button 2 is pressed, the second button 1 is in a pop-up state, and the driving assembly drives the snap-in sealing part 29 (left side in FIG. 4) that controls the on-off of the first water flow path to be open; that is, the liquid entering the valve cavity 21 passes through the left water inlet hole 26 and enters the left elastic membrane. Since the left snap-in sealing part 29 is open, the liquid flows from the left snap-in sealing part 29, through the corresponding flow channel 24, into the first water outlet 15. The liquid in the valve cavity 21 finally flows out of the first water outlet 15 through the corresponding flow channel 24. At the same time, the snap-in sealing part 28 (right in FIG. 4) that controls the on-off of the second water outlet 16 is closed; that is, the liquid entering the valve cavity 21 passes through the right water inlet hole 27 and enters the right elastic membrane. Thus, the right elastic membrane moves down under the water pressure, so the liquid cannot enter the corresponding flow channel 25 to flow out of the second water outlet 16. The right elastic membrane is reset when water pressure is released.

In this embodiment, the snap-in sealing part 28, 29 includes a snap-in part and a sealing part. The snap-in part and the sealing part are respectively located on the upper and lower portions of the elastic membrane. The snap-in sealing part 28, 29 is made of rigid plastic, while the sealing part is made of flexible rubber. The snap-in part 28, 29 is connected with a driving end of the driving assembly, and the driving end moves within the snap-in part to control the on/off of the snap-in part 28, 29. The sealing part 28, 29 is used to seal the way to the flow channel 24, 25 for the water outlet 15 or the second water outlet 16.

In the present embodiment, the elastic membrane has a shape of groove. The elastic membrane includes a transverse membrane and a longitudinal membrane extending from the transverse membrane in the circumferential direction, wherein the water inlet holes 26, 27 and the snap-in sealing part 28, 29 are provided on the transverse membrane. When the fluid enters the transverse membrane via the water inlet holes 26, 27, the water pressure stretches the longitudinal membrane and moves the transverse membrane downwards, until the snap-in sealing part 28, 29 seals the opposite flow channel 24, 25. The longitudinal membrane drives the transverse membrane to reset and the snap-in sealing part 28, 29 exits the opposite flow channel, after liquid is removed from the hollow structure of snap-in sealing part 28, 29.

According to an exemplary embodiment, the flow area of the hollow structure firstly decreases and then increases toward the valve cavity 21 from far to near. When the drive end of the driving assembly is located at the place where the flow area of the hollow structure is smallest, the snap-in sealing part 28, 29 is in a closed state; when the drive end of the driving assembly exits the place where the flow area of the hollow structure is smallest, the snap-in sealing part 28, 29 is in an open state. Through the cooperation of the hollow structure and the drive end of the driving assembly, rapid switching between the open and closed states of the snap-fit sealing portion can be realized, and the difficulty of operation is reduced.

According to an exemplary embodiment, the driving assembly comprises an inner shell, a transmission slider 8, two driving rods and two driving sliders. The inner shell is placed in the operating cavity and connected to the valve body 13, and a cavity is provided in the inner shell. The transmission slider 8 is arranged in the cavity and can reciprocate in the length direction in the cavity. Opposite ends of the transmission slider 8 are provided with two guiding surfaces. A clamping part is arranged between the two guiding surfaces. There are limiting slots on opposite sides of the clamping part. The two driving sliders are respectively sleeved and fixed on the top of the two driving rods. The top end of each driving slider is fixed with an opposite button. Opposite sides of the bottom end of each driving slider are respectively provided with a driving block for cooperating with the guide surface and an engaging part that is engaged with the limiting slot. The bottom end of the driving rod penetrates the inner shell and extends to the hollow structure of the snap-in sealing part 28, 29. The driving assembly has good driving effect and is easy to operate.

The two driving rods are a first driving rod 10 and a second driving rod 9. The two driving sliders are a first driving slider 5 and a second driving slider 4. The two guide surfaces of the transmission slider 8 include a first guiding surface and a second guiding surface. The two limiting slots of the clamping part are respectively a first limiting slot and a second limiting slot. Opposite sides of the bottom end of the first driving slider 5 are respectively provided with a first driving block and a first engaging part. Opposite sides of the bottom end of the second driving slider 4 are respectively provided with a second driving block and a second engaging part. The first driving slider 5 and the second driving slider 4 are respectively sleeved and fixed on the top ends of the first driving rod 10 and the second driving rod 9. The first button 2 and the second button 1 are respectively buckled on the top ends of the first driving slider 5 and the second driving slider 4. The bottom end of the first drive slider 5 extends into the left end of the transmission slider 8 (as shown in the left side of FIG. 3), and is located between the first guide surface and the first limiting slot. The bottom end of the second driving slider 4 extends into the right end of the transmission slider 8 (as shown in the left side of FIG. 3), and is located between the second guide surface and the second limit slot. The first driving rod 10 and the second driving rod 9 both pass through the transmission slider 8 and the inner shell, and extend into the snap-in sealing part 29 on the left side and the snap-in sealing part 28 on the right side of the diaphragm 12 respectively.

When the second button 1 is pressed, the second driving slider 4 drives the second driving rod 9 to move down. During the downward movement of the second driving slider 4, the second driving block of the second driving slider 4 follows the second guide surface, and the transmission slider 8 is pushed to drive the clamping part to move to the right in the inner shell until the second limiting slot is engaged with the second engaging part and the second driving slider 4 is in a locked state. At this time, the first limiting slot is separated from the first engaging part, the first driving slider 5 is in the unlocked state, and the first driving slider 5 pushes the first button 2 to pop up and reset. When moving down, the second driving rod 9 exits from the narrowest part of the hollow structure of the right snap-in sealing part 28, and the right snap-in sealing part 28 is in the open state. After the first driving slider 5 is unlocked, the first driving rod 10 moves up and enters the narrowest part of the hollow structure of the left snap-in sealing part 29, and the left snap-in sealing part 29 is in a closed state.

When the first button 2 is pressed, the first driving slider 5 drives the first driving rod 10 to move down. During the downward movement of the first driving slider 5, the first driving block of the first driving slider 5 follows the first guide surface, and the transmission slider 8 is pushed to drive the clamping part to move to the left in the inner shell until the first limiting slot is engaged with the first engaging part and the first driving slider 5 is in a locked state. At this time, the second limiting slot is separated from the second engaging part, the second driving slider 4 is in the unlocked state, and the second driving slider 4 pushes the second button 1 to pop up and reset. When moving down, the first driving rod 10 exits from the narrowest part of the hollow structure of the left snap-in sealing part 29, and the left snap-in sealing part 29 is in the open state. After the second driving slider 4 is unlocked, the second driving rod 9 moves up and enters the narrowest part of the hollow structure of the right snap-in sealing part 28, and the right snap-in sealing part 28 is in a closed state.

In the present embodiment, each driving slider includes a slider body and a stud provided on the slider body. The hollow structure passes through the slider body and the stud, to install the driving rod (and a spring). The top of the stud can be connected to the button by snap-in connection. The opposite ends of the slider body are respectively provided with a driving block and an engaging part. The driving block is a wedge-shaped block, and the engaging part is in the shape of a boss.

In the present embodiment, each guide surface is an inclined surface which is inclined from the bottom surface to the side wall of the transmission slider, and the inclined surface matches a driving surface of the driving block.

In the present embodiment, the transmission slider 8 includes a bottom plate and side walls extending from a circumferential edge of the bottom plate. The bottom plate can move back and forth along the inner shell. The clamping part is arranged in the middle of the bottom plate, and the clamping part is T-shaped. The clamping part is provided with a limiting slot facing one end surface of the bottom plate, a through hole for the driving rod (and the spring) to pass is provided on each of the opposite two sides of the clamping part, and a guide surface is provided between the through hole and the side wall.

In this embodiment, the driving rod includes a first rod section, a second rod section, and a third rod section that are arranged in sequence from top to bottom. The top of the first rod section is provided with a slot. The button is provided with an engaging part inside. The button is locked and fixed by the engaging part and the slot of the driving rod. The diameter of the second rod section is smaller than that of the first rod section and the third rod section. The third rod section matches the narrowest part of the hollow structure of the snap-fit sealing part. When the third rod section is located at the narrowest part, the snap-fit sealing part is closed; and when the third rod section is moved out of the narrowest part and the second rod section is located at the narrowest part, the snap-fit sealing part is opened. A gradual change section is arranged at the connection of the first rod section and the second rod section, and a gradual change section is arranged at the connection place of the third rod section and the second rod section.

According to an exemplary embodiment, a spring is sleeved on the driving rod. The top end of the spring is fixed to the driving slider, and the bottom end of the spring can abut against the inner shell. Pressing the button will cause the spring to deform. When the limiting slot is engaged with the engaging part, the spring is subject to the maximum force and cannot rebound; when the limiting slot is separated from the engaging part, the spring restores its shape and pushes the button to reset. By providing the spring, the reset of the button is faster and the effect is good.

In this embodiment, the two springs are the first spring 7 and the second spring 6. The first spring 7 is sleeved on the first driving rod 10 and penetrates into the first driving slider 5. The top end of the first spring 7 can be fixed with the first driving slider 5 or the first button 2 or the first driving rod 10. The installation and usage of the second spring 6 is the same as that of the first spring 7, and will not be repeated here.

In addition, according to an exemplary embodiment, the inner shell includes a sliding seat 11 and a cover 3 covered on the sliding seat 11, and enclosed to form a cavity. The sliding seat 11 is fixed to the valve body 13 on the side facing away from the cover 3. The sliding seat 11 is fixed on the valve cavity 21 of the valve body 13, and the sliding seat 11 and the valve body 13 clamp the diaphragm 12. The sliding seat 11 provides support for the transmission slider 8. The inner shell provides a moving space for the transmission slider 8 so that the transmission slider 8 can be accurately positioned, realizing the linkage of the first button 2 and the second button 1.

In the present embodiment, the circumferential edge of the valve cavity 21 is provided with a plurality of evenly distributed bolt holes, and the circumferential edge of the sliding seat 11 is also provided with a plurality of evenly distributed bolt holes. Bolts can pass through the oppositely arranged bolt holes and can be fixed.

In this embodiment, the sliding seat 11 is provided with a bottom plate, and the outer side of the bottom plate is surrounded by a waist-shaped inner wall and a square outer wall. The transmission slider 8 is placed on the bottom plate and can reciprocate along the length direction within the inner wall. The bolt holes are provided between the inner wall and the outer wall. The bottom plate is provided with two screw holes spaced-apart along the length direction, and the driving rod can pass through the screw holes.

The use process of the switching valve 100 will be further described below.

The switching valve 100 includes the valve body 13. The two opposite ends of the valve body 13 are respectively provided with the water inlet 14 and the first water outlet 15, and the valve cavity 21 of the valve body 13 is provided with the second water outlet 16. The housing 17 is sleeved and fixed on the valve body 13, the water inlet 14 and the first water outlet 15 respectively extend out of the housing 17, and the second water outlet 16 is arranged opposite to the first through hole 20. The cover 3, the transmission slider 8, the sliding seat 11 and the diaphragm 12 are successively abutted on the valve cavity 21. The transmission slider 8 is located in a cavity formed by the cover 3 and the sliding seat 11. The first driving rod 10 and the second driving rod 9 penetrate through the cover 3, the transmission slider 8, the sliding seat 11, the diaphragm 12 and into the valve cavity 21. The bottom ends of the first driving rod 10 and the second driving rod 9 are respectively inserted into the left snap-in sealing part 29 and the right snap-in sealing part 28 of the diaphragm 12. The first spring 7 and the second spring 6 are respectively sleeved on the first driving rod 10 and the second driving rod 9. The first driving slider 5 is sleeved on the first spring 7 and the first driving rod 10; the top ends of the first driving slider 5, the first spring 7 and the first driving rod 10 are all fixed to the first button 2. The second driving slider is sleeved on the second spring 6 and the second driving rod 10; the top ends of the second driving slider, the second spring and the second driving rod 9 are all fixed to the second button 1. Alternatively, the top ends of the first spring 7 and the second spring 6 are respectively fixed to the first driving slider 5 and the second driving slider. The first button 2 and the second button 1 pass through the second through hole 18 and the third through hole 19 respectively.

FIG. 3 is a schematic diagram of a first use state of the switching valve shown in FIG. 1. As shown in FIG. 3, the first button 2 pops up and the second button 1 is pressed. At this time, the second water flow path is opened and the second water outlet 16 discharges water. Specifically, when the second button 1 is pressed, the second driving slider 4 drives the second driving rod 9 to move down, and the second spring 6 begins to elastically deforms. During the downward movement of the second driving slider 4, the second driving block of the second driving slider 4 follows the second guide surface, pushing the transmission slider 8 to drive the clamping part to move to the right on the sliding seat 11, until the second limiting slot is engaged with the second engaging part; the second driving sliding block 4 is in the locked state, and the second spring 6 cannot spring back. At this time, the first limiting slot is separated from the first engaging part, the first driving slider 5 is in an unlocked state, and the first spring 7 restores its shape and drives the first driving slider 5 to push the first button 2 to pop up and reset. When the second driving rod 9 moves down, it exits from the narrowest part of the hollow structure of the right snap-in sealing part 28, and the right snap-in sealing part 28 is in an open state. The liquid entering the valve cavity 21 from the water inlet 14 enters the right elastic membrane through the right water inlet hole 27. Because the right snap-in sealing part 28 is opened, the liquid can flow into the second water outlet 16 from the right snap-in sealing part 28 through the corresponding flow channel 25, and the liquid in the valve cavity 21 also flows out of the second water outlet 16 through the corresponding flow channel 25. After the first driving slider 5 is unlocked, the first button 2 drives the first driving rod 10 to move up and enters the narrowest part of the hollow structure of the left snap-in sealing part 29, the left snap-in sealing part 29 is closed. The liquid entering the valve cavity 21 from the water inlet 14 enters the left elastic membrane through the left water inlet, and the left elastic membrane moves down under the water pressure to seal the flow channel 24 for the first water outlet 15, so that the liquid cannot enter the corresponding flow channel 24 to flow out from the first water outlet 15.

FIG. 4 is a schematic diagram of a second use state of the switching valve shown in FIG. 1. As shown in FIG. 4, the second button 1 pops up and the first button 2 is pressed. At this time, the first water flow path is opened and the first water outlet 15 discharges water. Specifically, when the first button 2 is pressed, the first driving slider 5 drives the first driving rod 10 to move down, and the first spring 7 begins to elastically deforms. During the downward movement of the first driving slider 5, the first driving block of the first driving slider 5 follows the first guide surface, pushing the transmission slider 8 to drive the clamping part to move to the left on the sliding seat 11, until the first limiting slot is engaged with the first engaging part; the first driving sliding block 5 is in the locked state, and the first spring 7 cannot spring back. At this time, the second limiting slot is separated from the second engaging part, the second driving slider 4 is in an unlocked state, and the second spring 6 restores its shape and drives the second driving slider 4 to push the second button 1 to pop up and reset. When the first driving rod 10 moves down, it exits from the narrowest part of the hollow structure of the left snap-in sealing part 29, and the left snap-in sealing part 29 is in an open state. The liquid entering the valve cavity 21 from the water inlet 14 enters the left elastic membrane through the left water inlet hole 26. Because the left snap-in sealing part 29 is opened, the liquid can flow into the first water outlet 15 from the left snap-in sealing part 29 through the corresponding flow channel 24, and the liquid in the valve cavity 21 also flows out of the first water outlet 15 through the corresponding flow channel 24. After the second driving slider 4 is unlocked, the second button 1 drives the second driving rod 9 to move up and enters the narrowest part of the hollow structure of the right snap-in sealing part 28, the right snap-in sealing part 28 is closed. The liquid entering the valve cavity 21 from the water inlet 14 enters the right elastic membrane through the right water inlet, and the right elastic membrane moves down under the water pressure to seal the flow channel 25 for the second water outlet 16, so that the liquid cannot enter the corresponding flow channel 25 to flow out from the second water outlet 16.

It can be seen from the above description and practice that, compared with the prior art, the switching valve proposed by the present disclosure has the following advantages: the valve body is kept in a normally open state, and by controlling the opening and closing of the diaphragm, the valve can be switched between the first water outlet and the second water outlet to realize the switching of the water flow paths and reduce the influence of water pressure.

Those skilled in the art should understand that the above descriptions are only specific embodiments of the present disclosure and are not intended to limit the present disclosure. Any modification, equivalent replacement and improvements, etc., made within the spirit of the present disclosure should all be included in the protection scope of this disclosure.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure

LIST OF THE REFERENCE NUMERALS IN THE DRAWINGS

100: switching valve
1: second button
2: first button
3: cover
4: second driving slider
5: first driving slider
6: second spring
7: first spring
8: transmission slider
9: second driving rod
10: first driving rod
11: sliding seat
12: diaphragm
13: valve body
14: water inlet
15: first water outlet
16: second water outlet
17: housing
18: second through hole
19: third through hole
20: first through hole
21: valve cavity
22: unsealing part
23: unsealing part
24: flow channel for the first water outlet
25: flow channel for the second water outlet
26: water inlet hole
27: water inlet hole
28: snap-in sealing part
29: snap-in sealing part

What is claimed is:

1. A switching valve, comprising:
    a valve body comprising a valve cavity and a water inlet, a first water outlet, and a second water outlet in communication with the valve cavity;
    a diaphragm comprising two unsealing parts respectively arranged upstream of the first water outlet and the second water outlet, wherein each unsealing part can control opening or closing of the first water outlet or the second water outlet disposed downstream thereof;
    a driving assembly, wherein both of the two unsealing parts are connected with the driving assembly, and the driving assembly can individually drive each of the unsealing parts to switch between opening and closing, such that at least one of the first water outlet and the second water outlet is in an open state;
    a housing sleeved and fixed on the valve body, wherein the water inlet and the first water outlet both extend out of the housing and wherein an operating cavity for accommodating the driving assembly is provided between the housing and the valve cavity; and
    wherein a first through hole which communicates with the second water outlet, and a second through hole and a third through hole which are arranged opposite to each other and communicated with the operating cavity, are provided on the housing.

2. The switching valve according to claim 1, wherein a cavity wall of the valve cavity is provided with two through holes spaced apart along a length direction of the valve cavity, wherein the two through holes are arranged opposite to a flow channel for the first water outlet and a flow channel for the second water outlet respectively.

3. The switching valve according to claim 2, wherein the diaphragm comprises a diaphragm body and the two unsealing parts, and the two unsealing parts are arranged on the diaphragm body and spaced apart along the length direction;
    wherein the diaphragm body is connected to a top cavity wall of the valve cavity, and the two unsealing parts can pass through the two through holes to partially enter the valve cavity respectively; and
    wherein each unsealing part can enter or exit the flow channel for the first water outlet or the flow channel for the second water outlet disposed opposite thereto.

4. The switching valve according to claim 3, wherein the two unsealing parts each include an elastic membrane which is connected to the diaphragm body and can be lifted and lowered, and the two unsealing parts also include a water inlet hole and a snap-in sealing part which are arranged oppositely and arranged on the elastic membranes;
    wherein the valve cavity supplies liquid to the elastic membrane via the water inlet hole, the snap-in sealing part penetrates through the elastic membrane and extends sideways, and the snap-in sealing part includes a hollow structure which extends in an axial direction; and
    wherein the driving assembly can penetrate through the hollow structure and can be moved back and forth, so as to open or close the snap-in sealing part, so that the snap-in sealing part can connect or cut off the flow channel for the first water outlet or the second water outlet disposed opposite to the snap-in sealing part.

5. The switching valve according to claim 4, wherein flow area of the hollow structure firstly decreases and then increases toward the valve cavity from far to near.

6. The switching valve according to claim 5, wherein:
    the driving assembly includes an inner shell, a transmission slider, two driving rods, and two driving sliders;
    the inner shell is arranged in the operating cavity and is connected to the valve body, and a cavity is provided in the inner shell;
    the transmission slider is arranged in the cavity and can reciprocate in the length direction in the cavity;
    opposite ends of the transmission slider are provided with guiding surfaces, wherein a clamping part is arranged between the guiding surfaces, and wherein there are limiting slots on opposite sides of the clamping part; and the two driving sliders are respectively sleeved and fixed on a top end of the two driving rods; wherein the top end of each driving slider is fixed with an opposite button, and wherein opposite sides of a bottom end of each driving slider are respectively provided with a driving block for cooperating with the guiding surface and an engaging part that is engaged with the limiting slot; wherein bottom ends of the driving rods penetrate the inner shell and extends into the hollow structure of the snap-in sealing part.

7. The switching valve according to claim 6, wherein a spring is sleeved on each driving rod, wherein a top end of each spring is fixed to the respective driving slider, and a bottom end of each spring can abut against the inner shell.

8. The switching valve according to claim 7, wherein the inner shell includes a sliding seat and a cover covered on the sliding seat which are enclosed to form the cavity, and wherein the sliding seat is fixed to the valve body on a side of the sliding seat facing away from the cover.

9. A switching valve, comprising:
a valve body comprising a valve cavity and a water inlet, a first water outlet, and a second water outlet in communication with the valve cavity;
a diaphragm comprising a diaphragm body and two unsealing parts respectively arranged upstream of the first water outlet and the second water outlet and on the diaphragm body spaced apart along a length direction, wherein each unsealing part can control opening or closing of the first water outlet or the second water outlet disposed downstream thereof;
a driving assembly, wherein both of the two unsealing parts are connected with the driving assembly, and the driving assembly can individually drive each of the unsealing parts to switch between opening and closing, such that at least one of the first water outlet and the second water outlet is in an open state;
a housing sleeved and fixed on the valve body, wherein the water inlet and the first water outlet both extend out of the housing and wherein an operating cavity for accommodating the driving assembly is provided between the housing and the valve cavity;
wherein a cavity wall of the valve cavity is provided with two through holes spaced apart along the length direction of the valve cavity, wherein the two through holes are arranged opposite to a flow channel for the first water outlet and a flow channel for the second water outlet respectively;
wherein the diaphragm body is connected to a top cavity wall of the valve cavity, and the two unsealing parts can pass through the two through holes to partially enter the valve cavity respectively; and
wherein each unsealing part can enter or exit the flow channel for the first water outlet or the flow channel for the second water outlet disposed opposite thereto.

10. The switching valve according to claim 9, wherein:
the two unsealing parts each include an elastic membrane, a water inlet hole, and a snap-in sealing part; and
each water inlet hole and snap-in sealing part is arranged oppositely on the elastic membrane.

11. The switching valve according to claim 10, wherein:
the valve cavity supplies liquid to the elastic membrane via the water inlet hole;
the snap-in sealing part penetrates through the elastic membrane and extends sideways; and
the snap-in sealing part includes a hollow structure that extends in an axial direction.

12. The switching valve according to claim 11, wherein the driving assembly can penetrate through the hollow structure of the snap-in sealing part and is configured to move back and forth to open or close the snap-in sealing part.

13. The switching valve according to claim 12, wherein an area of the hollow structure of the snap-in sealing part increases in a direction towards the valve cavity.

14. The switching valve according to claim 13, wherein the driving assembly includes an inner shell, a transmission slider, two driving rods, and two driving sliders.

15. The switching valve according to claim 14, wherein the two driving sliders are respectively sleeved and fixed on a top end of the two driving rods.

16. The switching valve according to claim 14, wherein a spring is sleeved on each driving rod.

17. The switching valve according to claim 14, wherein:
the inner shell of the driving assembly includes a cavity; and
the transmission slider of the driving assembly is arranged in the cavity and can move in the length direction in the cavity.

18. The switching valve according to claim 17, wherein:
opposite ends of the transmission slider are provided with guiding surfaces; and
a clamping part including limiting slots is arranged between the guiding surfaces.

19. The switching valve according to claim 14, wherein the inner shell includes a sliding seat and a cover covered on the sliding seat.

20. The switching valve according to claim 19, wherein the sliding seat is fixed to the valve body.

\* \* \* \* \*